Feb. 28, 1967   J. MÉNÉTRIER   3,306,584
CABLE STORING AND TAKE-UP DEVICE
Filed Jan. 14, 1965   3 Sheets-Sheet 1

Jacques Ménétrier
By Orland M. Christensen
ATTORNEY

United States Patent Office 3,306,584
Patented Feb. 28, 1967

3,306,584
CABLE STORING AND TAKE-UP DEVICE
Jacques Ménétrier, Ville-d'Avray, Seine-et-Oise, France, assignor to SIAR, Societe Industrielle d'Application des Radioelements, Levallois, France
Filed Jan. 14, 1965, Ser. No. 425,570
4 Claims. (Cl. 254—175.5)

The present invention relates to a cable storing and take-up device for a cable having external helical reinforcement, and intended for the transmission of mechanical movements.

As is well known, numerous transmissions are effected by means of a mechanical cable with external helical reinforcement. Such cable is engaged by one or more rotative pinions, whereby it is pushed or pulled.

In certain cases, when it is desired, for example, to push or pull an object along an extended path, there must be a sufficient length of cable, including a certain length of reserve, in order to ensure the to and fro travel of the object along said path. It will be understood that this reserve of cable is then cumbersome unless it is stored in a compact space, since it is linearly extended for a great length.

It is an object of the invention to obviate or minimize this disadvantage, by producing an apparatus alowing the reserve of cable to be stored in a relatively reduced volume having no large dimension.

To this end, the invention consists in a storing and take-up device for a cable such as has external helical reinforcement or strands, and is intended for the transmission of mechanical movements. It comprises in combination a flat, cylindrical, hollow drum mounted for rotation about an axis, the depth of which drum is only slightly greater than the diameter of said cable, whereby the several stored coils lie in a common plane, said drum having a central annular opening for passing the cable in or out, a non-rotative or fixed cover overlying the drum, a cable-guiding conduit secured to the cover and terminating at the said annular opening, means for continuously resisting the inertia of the drum and cable stored therein in rotation, when the inlet and outlet movement of the cable in the apparatus is stopped, and means for overcoming said inertia when the cable is made to leave the apparatus.

The means for resisting the inertia of the drum in rotation, when the inlet and outlet movements of the cable in the apparatus are stopped, may be constituted by a brake of any suitable form, applicable in coordination with stoppage of the cable, and herein shown as comprising a belt secured by a fixed pulley and rubbing on a turning pulley.

When the operation of advancing the cable is electrically driven, the means for resisting the inertia of the drum may be constituted by an electromagnetic clutch or an electro-mechanical device, such as stops rotation of the drum when the electrical drive is interrupted. The drum may have an internal stop, on which the end of the cable comes to rest, or to which its end is secured. Appropriate means may secure the end of the cable within the drum.

In order that the invention may be more clearly understood, reference will now be made to the accompanying drawings which diagrammatically show one embodiment thereof by way of example, and in which.

Figure 1:
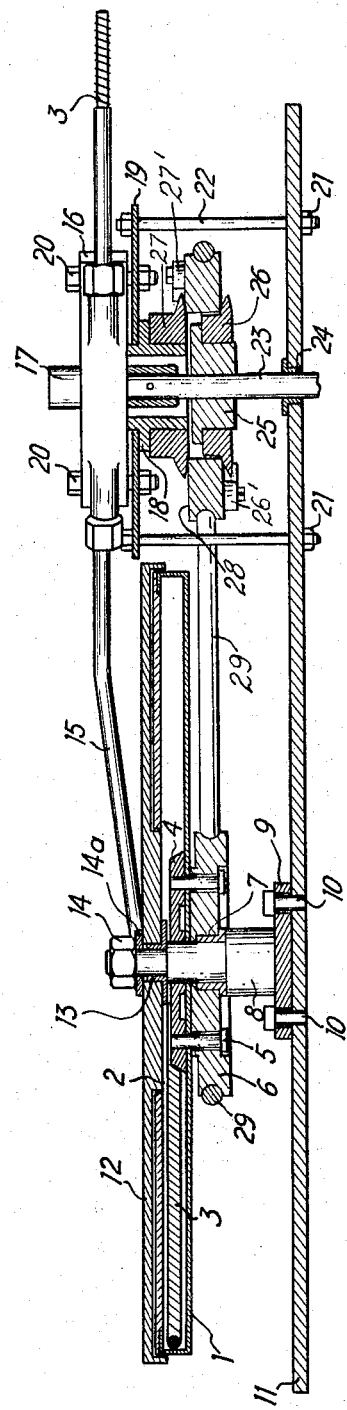
FIGURE 1 is a sectional view of mechanism according to the invention.

Referring now to FIGURE 1 of the drawings, the cable-storing and take-up device according to this invention comprises a magazine such as a flat, hollow, cylindrical drum 1 having an annular opening 2 adjacent its center. In order that the cable 3, having an exterior helical reinforcement, will be drawn to the inside peripheral portion of the drum, away from the central region of the drum, its end may be fixed at or engage the drum at a point 1a, and a fixed annular member 4 is fixed to the base of the drum by means such as screw 5, which also secure the drum to a freely rotative pulley 6. Said pulley 6 is mounted on a bearing 7 carried by a non-rotative upright shaft 8, which has a plurality of shoulders. The lower shoulder of the shaft 8 holds the bearing 7. The shaft 8 is itself secured to a base 9, fixed by screws 10 or otherwise to a plate 11 supporting the device.

The cylindrical drum 1 has a fixed or non-rotative cover 12, carrying at its center a centering bushing 13, which is screwed or otherwise fixed upon the upper end of the shaft 8, and rests upon the upper shoulder of the latter. A nut 14, with washer 14a, threaded upon the shaft, holds the cover on the shaft 8. A cable-guiding conduit 15 is fixed on the cover 12 by suitable means, such as a small plate 15a.

The cable guide 15 terminates, at its other end, in a casing 16 enclosing a pinion (not shown) positively and reversibly driven by a shaft 17. The pinion drives cable 3, in known fashion, pushing it as arrows P4 and P5 indicate, or pulling it according to arrow P3. The casing 16 is secured to a ring 18, itself connected to a supporting plate 19. The assembly of the casing 16 and of the ring 18 is non-rotative, being suitably fixed onto the supporting plate 19, as by means of nuts 20, and the supporting plate 19 is itself fixed by means of nuts 21 and rods 22 on the plate 11 supporting the device. Thus the two ends of the cable-guiding conduit 15 are fixed with respect to one another in space, in order that the conduit cannot become twisted.

Figure 2:
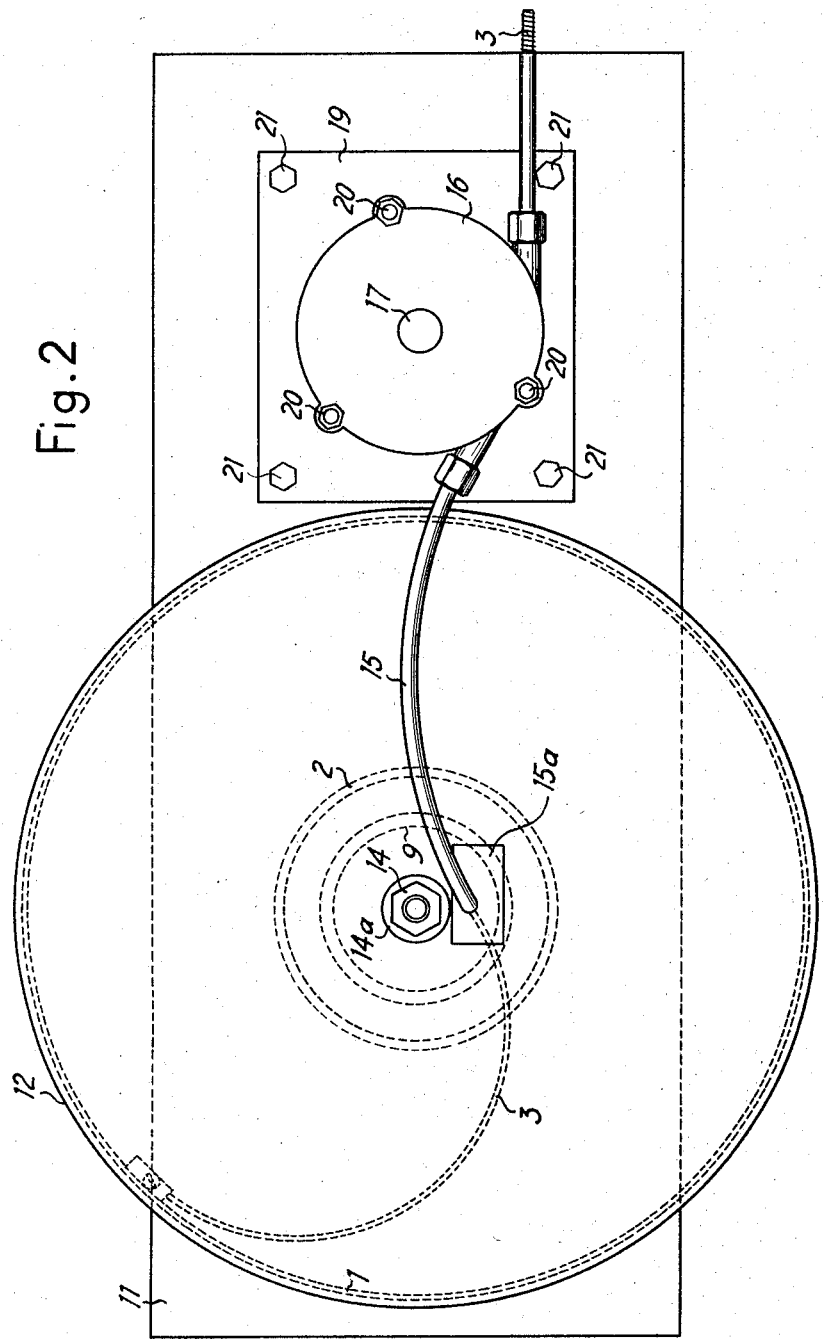
FIGURE 2 is a view from above.
Figure 3:
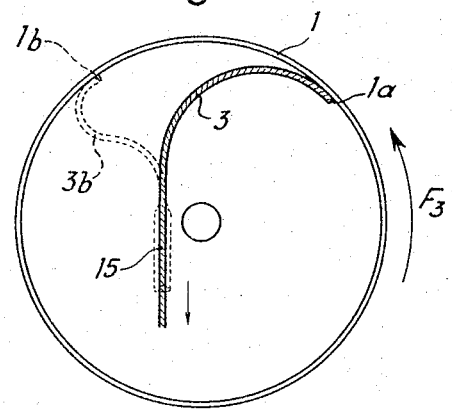
FIGURE 3 is a diagrammatical view showing the position the cable may assume in the drum after the cable has been pulled in the direction indicated by arrow P3, and the pulling movement has been abruptly stopped, if the present invention were not employed.

An extension 23 may be employed, fixed upon and rotative with the shaft 17. The extension is journaled at 24 in the plate 11. A pulley 28 is aligned or coplanar with pulley 6, and the two pulleys are interconnected by a belt 29. The driving means intermediate the pulley 6 and the rotative extension 23 also includes certain ratchet mechanism. This ratchet mechanism includes a ring 25, fixed to and rotative with a ratchet wheel 26 that rotates with extension 23, and a second ratchet wheel 27 fixed to non-rotative ring 18 that is fixed to supporting plate 19. The two ratchet wheels 26 and 27 and the dogs 26' and 27' carried by pulley 28 whereby they are engaged are alike, except that when shaft 17 and its extension 23 rotate in one direction (counterclockwise in FIGURE 2) the arrangement is such that ratchet wheel 26 and its dogs tend to rotate the pulley 28 positively and counterclockwise, and the other dogs ratchet over ratchet wheel 27, whereas when shaft 17 and its extension 23 rotate in the opposite direction (clockwise) ratchet wheel 27 and its dogs engage and halt rotation of pulley 28, although the cable-driving pinion continues to rotate to push the cable into the drum 1. The ratchet wheel 26 and its dogs merely ratchet past one another in this latter instance.

The belt 29 preferably is in the form of a helically coiled spring, such as is used in cinematographic projection apparatus. Such a belt has the advantage that it can drive pulley 6 from pulley 28 when the latter rotates, yet on the other hand it will slide on the driving pulley 28 whenever the latter is stopped, as it is whenever ratchet wheel 27 is engaged by its dogs, and thereby stops rotation of pulley 28 that carries these dogs. Nevertheless, such sliding of belt 29 on pulley 28 imposes a considerable drag or braking on pulley 6, sufficient to stop rotation of the latter and its drum 1 under their acquired inertia whenever rotation of driving extension 23 is abruptly stopped.

Figure 4:
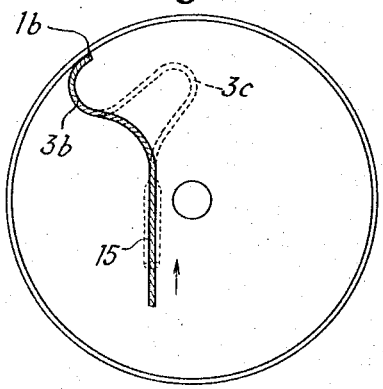
FIGURE 4 is a similar view showing the position of the cable after it has been stopped, as in FIGURE 3, and then pushed in the direction indicated by arrow P4.
Figure 5:
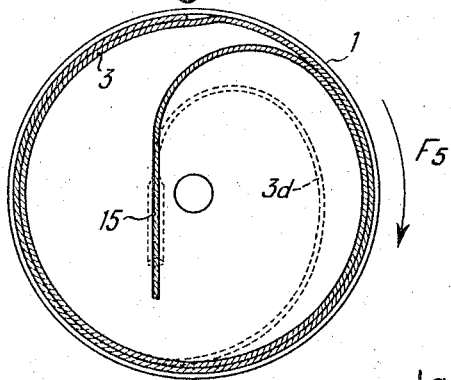
FIGURE 5 is a similar view showing the position of the cable in the drum after the cable has been pushed in the direction indicated by arrow P5, and the pushing movement has been abruptly stopped, in the absence of the present invention.

If this braking did not occur, the cable could take the position shown by dotted lines at 3b, its internal end which was at 1a coming to 1b, in consequence of the continuing rotation of the drum 1. When the movement of the cable in the opposite direction P4 follows, that is to say, in the direction of the introduction of the cable into the drum 1, as shown diagrammatically in FIGURE 4, in consequence of the position previously taken by the end of the cable at 1b the cable could kink, or take the inside position shown in dotted lines at 3c, and it would no longer be possible to wind it normally within the cage.

Finally, when the shaft 17 and its extension 23 are rotated in the direction which causes the cable 3 to enter the drum 1 (clockwise in FIGURE 2) according to arrow P5, rotation of the pulley 28 is halted by engagement of the dogs upon that pulley with ratchet teeth on fixed ratchet wheel 27. The drum 1 is and continues to be rotated by the pushing of the cable, and the pulley 6 that is fast to the drum is rotated also, but the belt 29 that extends about the now fixed pulley 28 and the now rotative pulley 6 rubs frictionally over the pulley 28. This creates such braking that whenever the inward movement of the cable stops, the rotation of pulley 6 stops, and also the rotation of drum 1, so that inertia can not cause further rotation of the drum.

Naturally, other means than those described above may be provided for resisting the rotational inertia of the drum. In the case, for example, of a mechanical cable actuated by means of an electrical device, an electromagnetic or electro-mehanical brake applicable to the drum upon stoppage of the cable is suitable.

I claim as my invention:

1. A storing and take-up device for stranded cable comprising
   rotatable drum means,
   guide means for directing cable into and out of said drum means,
   reversible drive means for moving cable along said guide means,
   belt means coupled to said rotatable drum means for driving said rotatable drum means in one direction of rotation and braking said rotatable drum means in the other direction of rotation,
   ratchet means coupling said belt means to said reversible drive means and operative to drive said belt means in one direction of rotation and to produce a braking effect on said belt means in the other direction of rotation.

2. The combination according to claim 1 wherein said ratchet means comprises
   pulley means for driving said belt means,
   ratchet dog means mounted on said pulley means,
   a first ratchet wheel driven by said reversible drive means, and
   a second ratchet wheel fixedly positioned against rotation,
   said ratchet dog means engaging said first ratchet wheel to drive said pulley means in one direction of rotation and engaging said second ratchet wheel to stop said pulley means in the other direction of rotation.

3. In combination with a rotative hollow drum of slight axial depth wherein is to be stored a cable of a diameter approximating the drum's depth, with its end engaged at a given point with the inner periphery of the drum, a first pulley rotative with said drum, said drum having a central annular opening, a guide for such a cable fixed with relation to the drum and communicating through said annular opening with the interior of the drum, positively driven and reversible rotative means arranged for engagement with the cable in its passage through the cable guide for pulling the cable from or pushing it into the drum, and thereby effecting rotation of the drum, a second pulley rotatable coaxially of said reversible rotative means, and means, including ratchet drive mechanism, interconnecting said second pulley and said reversible rotative means to effect conjoint rotation thereof in one rotational direction and to halt rotation of said second pulley in the other rotational direction, said interconnecting means including drive-transmitting means frictionally interconnecting the two pulleys to impose a drag upon the first pulley and its drum in the event of abrupt stoppage of the reversible rotative means.

4. In combination with a rotative hollow drum wherein is to be stored a cable such as has its end engaged at a given point with the inner periphery of the drum, said drum having a central annular opening, a fixed cable guide for guiding the cable into and from the drum through said opening, a first pulley rotative with said drum, positively driven and reversible rotative means arranged for engagement with the cable in its passage through the cable guide, for effecting its inward or outward movement, and thereby effecting corresponding rotation of the drum, a second pulley, belt means operatively connecting the two pulleys but slidable frictionally relative to the first pulley when rotation of the second pulley stops, and drive means intermediate said reversible rotative means and said second pulley including a ring rotatable with the rotative means, a first ratchet wheel coaxial of said ring but held against rotation therewith during rotation in the direction to urge the cable into the drum, a second ratchet wheel also coaxial of said ring and fixed to the latter for conjoint rotation, and two ratchet dog means carried by the second pulley and engaging the respective ratchet wheels, one ratchet dog means being arranged to effect rotation of the second pulley, and of the drum as driven by said belt, with the ring and the rotative means during rotation in the direction to urge the cable out of the drum, and the other ratchet dog means being arranged to engage the first ratchet wheel during rotation in the opposite direction, friction between the belt and the now non-rotative second pulley halting rotation of the first pulley and drum upon cessation of inward movement of the cable.

References Cited by the Examiner

UNITED STATES PATENTS

| | | | |
|---|---|---|---|
| 1,531,114 | 3/1925 | McBride | 188—83 |
| 1,712,075 | 5/1929 | Hemberger | 188—83 X |
| 2,594,484 | 4/1952 | Nixon | 254—173 X |
| 2,695,086 | 11/1954 | Parker | 254—187 X |
| 2,709,220 | 5/1955 | Spector | 242—54 X |
| 2,796,221 | 6/1957 | Carlson | 242—54 |
| 2,907,416 | 10/1959 | Comba | 254—175.5 X |

SAMUEL F. COLEMAN, *Primary Examiner.*